(12) United States Patent
Kato et al.

(10) Patent No.: US 6,216,663 B1
(45) Date of Patent: Apr. 17, 2001

(54) INJECTED ENGINE CONTROL

(75) Inventors: Masahiko Kato; Hiroaki Fujimoto, both of Hamamatsu (JP)

(73) Assignee: Sanshin Kogyo Kabushiki Kaisha, Shizuoka (JP)

( * ) Notice: Subject to any disclaimer, the term of this patent is extended or adjusted under 35 U.S.C. 154(b) by 0 days.

(21) Appl. No.: 09/299,769

(22) Filed: Apr. 26, 1999

(30) Foreign Application Priority Data

Apr. 24, 1998 (JP) .................................................. 10-114968
May 1, 1998 (JP) .................................................. 10-121999

(51) Int. Cl.$^7$ ...................................................... F02B 5/00
(52) U.S. Cl. ........................................... 123/305; 123/295
(58) Field of Search ...................................... 123/305, 295, 123/303, 478, 490, 480, 486; 60/274, 285

(56) References Cited

U.S. PATENT DOCUMENTS

| | | | |
|---|---|---|---|
| 4,538,581 | * | 9/1985 | Hakansson ............................ 123/502 |
| 4,718,387 | * | 1/1988 | Shinchi et al. ........................ 123/478 |
| 4,911,132 | * | 3/1990 | Nakaniwa et al. ................... 123/492 |
| 5,694,909 | * | 12/1997 | Kato ..................................... 123/672 |
| 5,730,099 | * | 3/1998 | Gillespie ............................. 123/295 |
| 5,762,040 | * | 6/1998 | Taipale et al. ....................... 123/299 |

* cited by examiner

*Primary Examiner*—Henry C. Yuen
*Assistant Examiner*—Mahmoud M Gimie
(74) *Attorney, Agent, or Firm*—Knobbe, Martens, Olson & Bear, LLP

(57) ABSTRACT

An improved fuel injection control for direct injected, multiple cylinder, internal combustion engines. The injection control is done by a feed back control device based upon an air fuel ratio sensor. The primary feature of this invention is that the respective injection timing for cylinders are shifted relative to each other so that at least one of the state of emissions contained in the burnt charge and the state of fuel efficiency is almost the optimal every cylinder. In one embodiment, the respective injection timings are controlled to be at the timing where emissions are almost the minimum at each cylinder. In another embodiment, one of the injection timings associated with the cylinder that has the air fuel ratio sensor is advanced than the timing where emissions are almost the minimum.

42 Claims, 7 Drawing Sheets

INJECTED ENGINE CONTROL

BACKGROUND OF THE INVENTION

1. Field of the Invention

This invention relates to a fuel injection control for an engine and more particularly to an improvement of a fuel injection control for a direct cylinder injected, multiple cylinder engine.

2. Description of Related Art

Some of internal combustion engines with multiple cylinders are provided with a fuel injection system including a feedback control system therein. The fuel injection system has a single fuel injector at an air intake manifold or a plurality of fuel injectors at respective air intake passages. The feed back control system, although executes other controls such as a firing control of spark plugs, generally controls amounts of the injected fuel to restrain dispersion of the air fuel ratio (A/F) between the respective cylinders. That is, the control is done to obtain the optimal air fuel ratio in the aggregate and eventually to improve total emissions and fuel efficiency. For this purpose, for example, an oxygen density sensor ($O_2$ sensor) is provided at a specific cylinder. The feed back control system controls amounts of the injected fuel for respective cylinders in response to the output from the $O_2$ sensor. More specifically, duration of opening time of control valves is controlled. The control valves are provided at nozzles of the respective fuel injectors.

In the mean time, a direct cylinder injection system is also embodied in such multiple cylinder engines. This system controls to inject lean fuel directly into combustion chambers of the respective cylinders so as to improve fuel efficiency.

FIG. 1 shows various operational ranges of the direct cylinder injected engine, which is applied to an outboard motor, in a matrix of the engine speed versus the engine load.

The engine is operated with rich fuel (A/F=11 to 12) in the range A of the low speed and low load like the idling or trolling state. Meanwhile, the engine is operated with lean fuel (A/F=15 to 16) in the range B of the middle speed and middle load. Further, it is operated with excessive rich fuel (A/F is approximately 11) in the range C of the high speed and high load. Under such operational conditions, conventionally, amounts of the injected fuel are controlled to obtain the optimal air fuel ratio.

However, as seen in FIG. 2, particularly in the range of lean A/F, i.e., the range B, changes in the air fuel ratio by the adjustment of fuel amounts exert relatively large influence to the output power of the engine because of the sensitiveness in the lean A/F set range. In addition, since the direct injected engine must employ the injection pressure that is extremely larger than that of the intake injected engine, the amount of the injected fuel per unit time is also large. This means that changes in the diameter of the control valves provided at the respective fuel injector nozzles caused by, for example, aging can give rise to the difficulty in fine adjustment of the air fuel ratio. Because of these reasons, each cylinder can generate different outputs, emissions and fuel efficiency.

The difficulty in fine adjustment exists remarkably in the lean A/F set range that focused on the improvement in fuel efficiency. That is, subtle changes in the air fuel ratio cause the relatively large changes in the output power and then make the dispersion in the respective outputs of the cylinders. This results in the difficulty in optimizing emissions and fuel efficiencies at each cylinder.

The operational ranges will be described more in detail in connection with a control strategy of a preferred embodiment later.

Multiple cylinder engines for marine propulsion devices such as outboard motors generally have aggregated exhaust passages whereby exhaust gasses are discharged to the atmosphere through the body of water. Such an engine tends to be influenced by the states in the other cylinders and also the back pressure of the surrounding body of water. Particularly, the multiple cylinders of the outboard motor are disposed vertically with each other and hence each cylinder has a different height from the water surface. Accordingly, respective lengths of the exhaust passages are different to each other so that the influences of the back pressure are also different. In addition, each cylinder has a different temperature therein. Thus, the dispersions in the air fuel ratio and also in the output of the respective cylinders can easily occur.

It is, therefore, a principal object of this invention to provide an improved direct injected, multiple cylinder engine wherein the dispersions in air fuel ratio and also in outputs of the respective cylinders can be as small as possible.

In addition to that, direct injected engines that operate on a two stroke crankcase compression principle are likely to have another problem. The output characteristics of the air fuel ratio in this two stroke engine tend to shift to the rich side in comparison with an engine which operates on a four stroke principle or an engine which has an intake injection system. Because, blow-out amounts of mixture in this two stroke engine exert large influence to the air intake efficiency. The term "blow-out amounts of mixture" means amounts of unburnt charge that is formed with the injected fuel and the intake air charge induced through the scavenge port and will be discharged outside through the exhaust port.

The situation occurring in a two stroke engine will be described more in detail hereunder with reference to FIG. 3.

FIG. 3 illustrates a graphical view showing the relationship between the air fuel ratio and the output power of the engine.

In this graph, the characteristic curve identified with the reference characters a, b and c represent the outputs of the $O_2$ sensor in a four stroke engine, a two stroke engine it, with the intake injected system and a two stroke engine with the direct injected system, respectively.

As seen in this figure, the curve a abruptly changes nearly at the theoretical air fuel ratio T.A/F. Because, all of the air charges including oxygen are almost completely burnt and exhaust gasses hardly contain any unburnt charges or air charges therein in the 29, four stroke engine. Thus, fuel amounts of the four stroke engine are relatively easily controlled in a feed-back control manner based upon the output of the $O_2$ sensor so that the air fuel ratio is always kept in the optimal state. The unburnt charges (gasses) contain the sprayed liquid fuel as well as air charges.

However, the curve b, as seen in FIG. 3, shifts to the rich side from the theoretical air fuel ratio T.A/F. Because, in the two stroke engine with the intake injected system, unburnt charges as well as the air charges reach the position of the $O_2$ sensor. The curve c further shifts to the rich side because only air charges reach the $O_2$ sensor in the two stroke engine with the direct injected system.

In some outboard motors having a multiple cylinder engine, the air fuel ratio feed back control system has the $O_2$ sensor at a specific cylinder as described above. The cylinder is a reference cylinder and only this cylinder is controlled in a feed back control manner based upon the output of the $O_2$ sensor. Meanwhile, the other cylinders are controlled with the control amount that is adjusted to the control amount of the reference cylinder by calculation so as to be adapted to each cylinder in every running range.

In the adjustment calculation, if the change portion of the characteristic curve is shifted to the rich side like the curves b and c, conventionally, the reference cylinder is incorrectly controlled so that the air fuel ratio thereof approaches the objective air fuel ratio that is shifted to the rich side. In other words, the injected fuel will be under the excessive rich condition. Accordingly, the fuel efficiency and emissions are not improved. The other cylinders are also controlled to be at the rich side and hence cause the same problem.

This problem also occurs with a linear sensor as well as the $O_2$ sensor.

FIG. 4 illustrates a graphical view showing the relationship between the air fuel ratio and the output of a linear sensor as shown in FIG. 3, the curve a is omitted though. The same reference characters in this figure as in FIG. 3 indicates the situations at the same engine and the injection system.

It is, therefore, another object of this invention to provide an improved direct injected, multiple cylinder engine, particularly a two stroke engine, wherein deviation from the optimal air fuel ratio, i.e., the theoretical air fuel ratio in control can be as small as possible.

SUMMARY OF THE INVENTION

This invention is adapted to be embodied in a direct cylinder injected, internal combustion engine.

In accordance with one aspect of this invention, a plurality of cylinders are provided and each cylinder has a combustion chamber. An air induction system is provided for delivering an air charge to the respective combustion chambers. A plurality of fuel injectors are provided for the respective combustion chambers for injecting fuel directly into the combustion chambers for burning with the air charge delivered by the induction system. An exhaust system is provided for discharging the burnt charge from the combustion chambers. A control device is provided for controlling at least the injection timings of the fuel injectors. The control device shifts the respective injection timings of the cylinders relative to each other so that at least one of the state of emissions contained in the burnt charge and the state of fuel efficiency is almost the optimal every cylinder.

BRIEF DESCRIPTION OF THE DRAWINGS

This and other features of this invention will now be described with reference to the drawings of preferred embodiments which are intended to illustrate and not to limit the invention.

As noted above.

FIG. 1 is a graphical view showing various operational ranges, i.e., the engine speed versus the throttle valve opening (engine load), of the direct cylinder injected engine that is applied for, e.g., marine engines such as outboard motors.

FIG. 2 is a graphical view showing the relationship between the air fuel ratio and the output power of the engine.

FIG. 3 is a graphical view showing the relationship between the air fuel ratio and the output of an oxygen ($O_2$) sensor.

FIG. 4 is a graphical view showing the relationship between the air fuel ratio and the output of a linear sensor.

DETAILED DESCRIPTION OF THE PREFERRED EMBODIMENTS OF THE INVENTION

Figure 5:
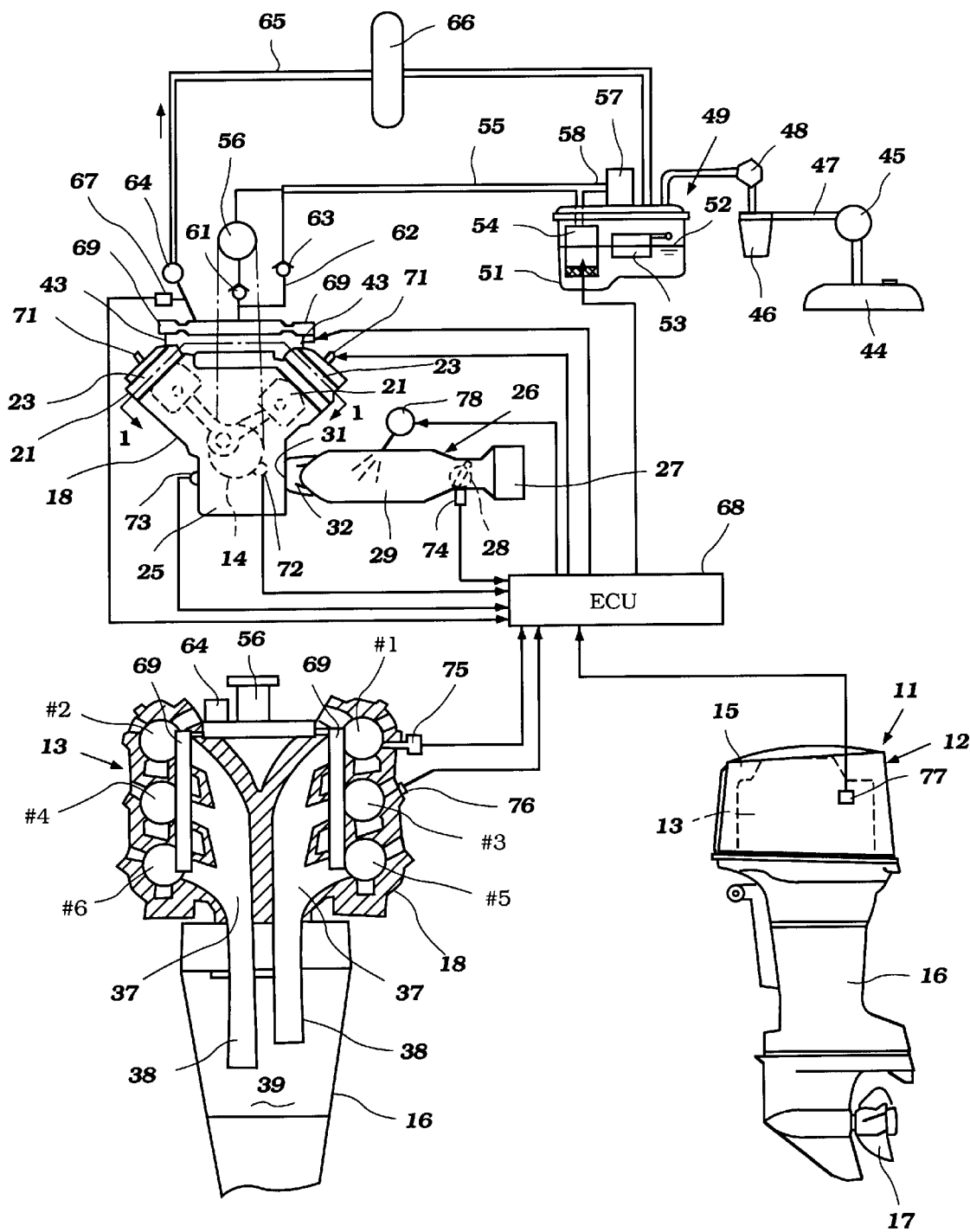
FIG. 5 is a partially schematic view having three portions that are connected by the controlling ECU (electronic control unit) of the engine. The lower right hand portion of this view shows a side elevational view of an outboard motor, the lower left hand portion shows a rear elevational view of the outboard motor on an enlarged scale and a partial cross-section of the engine taken through the cylinders and exhaust manifold and the upper portion shows a top plan view of the engine and the fuel supply system with portions shown schematically. The partial cross-section in the lower left hand portion is the view taken along the line 1—1 in the upper portion.

Referring initially primarily to FIG. 5, the lower right hand portion of this view illustrates a side elevational of an outboard motor that is constructed and operated in accordance with the invention. The outboard motor is indicated generally by the reference numeral 11 and except as will hereinafter be noted maybe considered to be of a generally conventional construction.

The outboard motor 11 comprises a power head 12 that contains a powering internal combustion engine 13. As best seen in the other two portions of this figure, the engine 13 is, in this embodiment, of the V6 type and operates on a two stroke crankcase compression principal. Although the number of cylinders and cylinder orientation can be varied, the invention has particularly utility in connection with two cycle engines and particularly those having multiple cylinders #1 to #6 but certain of the control strategy also is applicable to four cycle engines.

As is typical with outboard motor practice, the engine 13 is supported in the power head 12 so that its crankshaft 14 rotates about a vertically extending axis for a reason which will be described momentarily.

The power head 12 is completed by a protective cowling 15 which surrounds and protects the engine 13. This protective cowling 15 is formed with an air inlet opening so that induction air for operation for the engine 13 can be drawn from the surrounding atmosphere.

The engine 13 and specifically its crankshaft 14 are coupled to a driveshaft (not shown) that depends into and is journaled within a driveshaft housing lower unit assembly 16. This is the reason for the vertical orientation of the axis of rotation of the crankshaft 14. This driveshaft depends into the lower unit where it drives a propulsion device for an associated watercraft through a suitable transmission. In the illustrated embodiment, the propulsion device comprises a propeller 17 which is selectively driven in forward and reversed directions through a bevel gear reversing transmission of the type well known in this art.

The outboard motor 11 also includes clamping and swivel brackets or another arrangement for mounting it to the transom of an associated watercraft. Since these types of constructions are well known in the art, further description of them is not believed to be necessary to permit those skilled in the art to practice the invention. The mounting arrangement is such, however, that the height and trim angle of the propeller 17 may be adjusted, even during running. This is significant in the engine control, as will become apparent.

Figure 6:
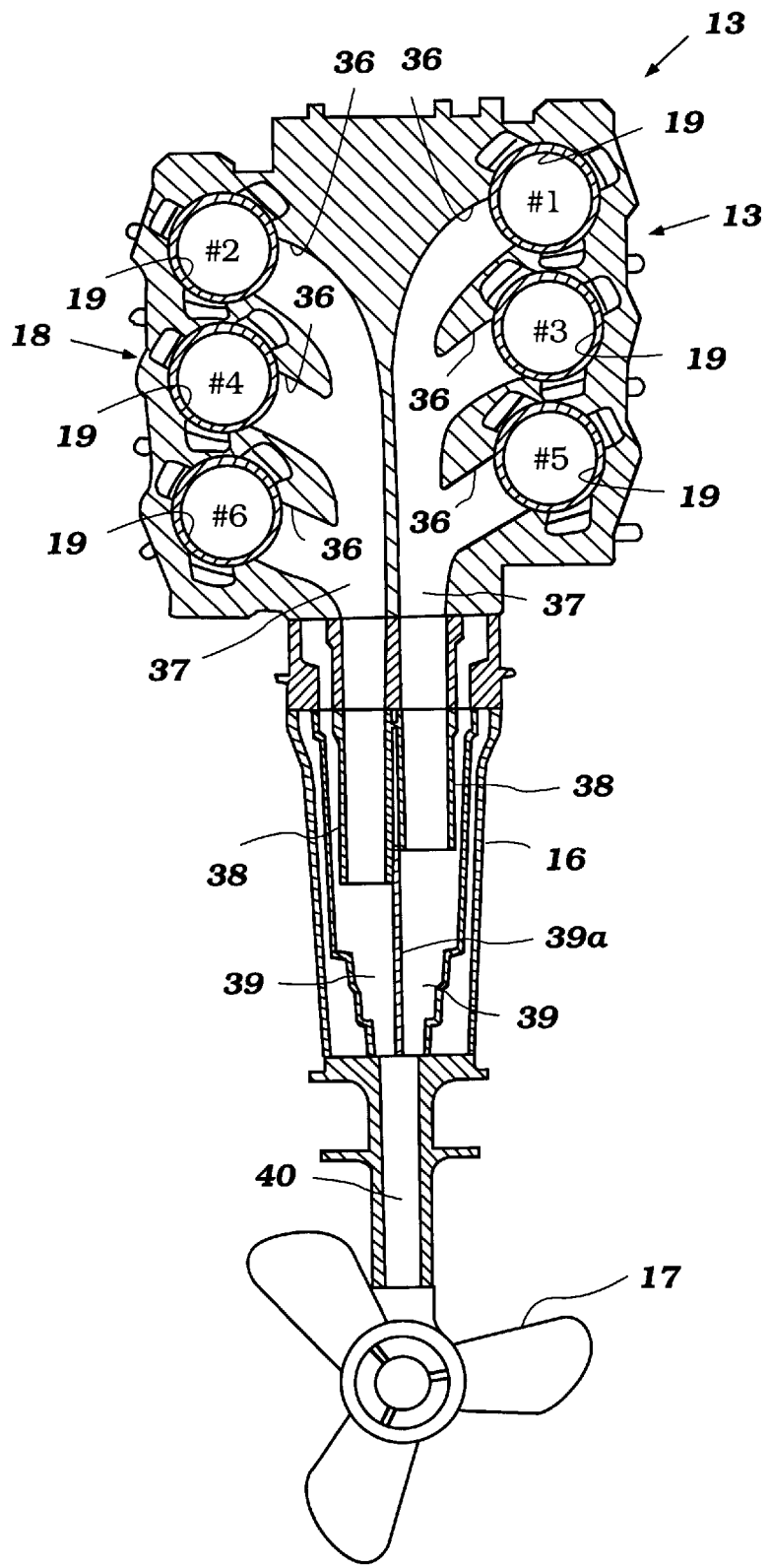
FIG. 6 is an enlarged and more complete view of the outboard motor as shown in the lower left-hand view of FIG. 1.

Referring now primarily to the lower left hand view and the upper view of FIG. 5 and additionally to FIG. 6, the engine 13 includes a cylinder block, indicated generally by the reference numeral 18. Because of the V-type configuration employed in this embodiment, the cylinder block 18 is formed with two cylinder banks each of which has three vertically spaced cylinder bores 19. Pistons 21 are slidably supported in the cylinder bores 19. The pistons 21 are connected by means of connecting rods 22 to the throws of the crankshaft 14 for driving it in a known manner.

Cylinder head assemblies, indicated generally by the reference numeral 23, are affixed to the banks of the cylinder block 18 and close the cylinder bores 19. These cylinder head assemblies 22, the cylinder bores 19 and the pistons 21 form the combustion chambers of the engine 13.

The crankshaft 14 rotates in a crankcase chamber defined by the cylinder block 18 and a crankcase member 24 that is affixed thereto. As is typical with two cycle crankcase compression engines, the portions of the crankcase chamber, indicated schematically at 25, associated with each of the cylinder bores 19 are sealed from each other.

An air charge is delivered to these individual crankcase chamber sections 25 by an air induction system which appears also in the upper portion of FIG. 5 and which is indicated generally by the reference numeral 26. This induction system 26 includes an air inlet device 27 that may include a silencing arrangement and which draws air from within the protective cowling 15 that has been admitted through the aforenoted inlet opening.

A throttle valve 28 is provided in throttle bodies that communicate with the intake device 27 and deliver it to intake manifold runners 29 of an intake manifold assembly. The throttle valves 28 are controlled in any suitable manner to satisfy the operator demand. The intake manifold runners 29 communicate with intake ports 31 formed in the crankcase member 24 and each associated with a respective cylinder bore 19.

Reed type check valves 32 are provided in the manifold runners 29 adjacent the intake ports 31. These reed type check valves permit an air charge to be drawn into the crankcase chambers when the respective pistons 21 are moving upwardly in their cylinder bores 19. As the pistons 21 move downwardly, the charge in the crankcase chambers 25 will be compressed and the respective reed type check valve 32 will close to preclude reverse flow. An intake air temperature sensor 32a is also provided in the manifold runners 29 adjacent the intake ports 31.

Figure 7:
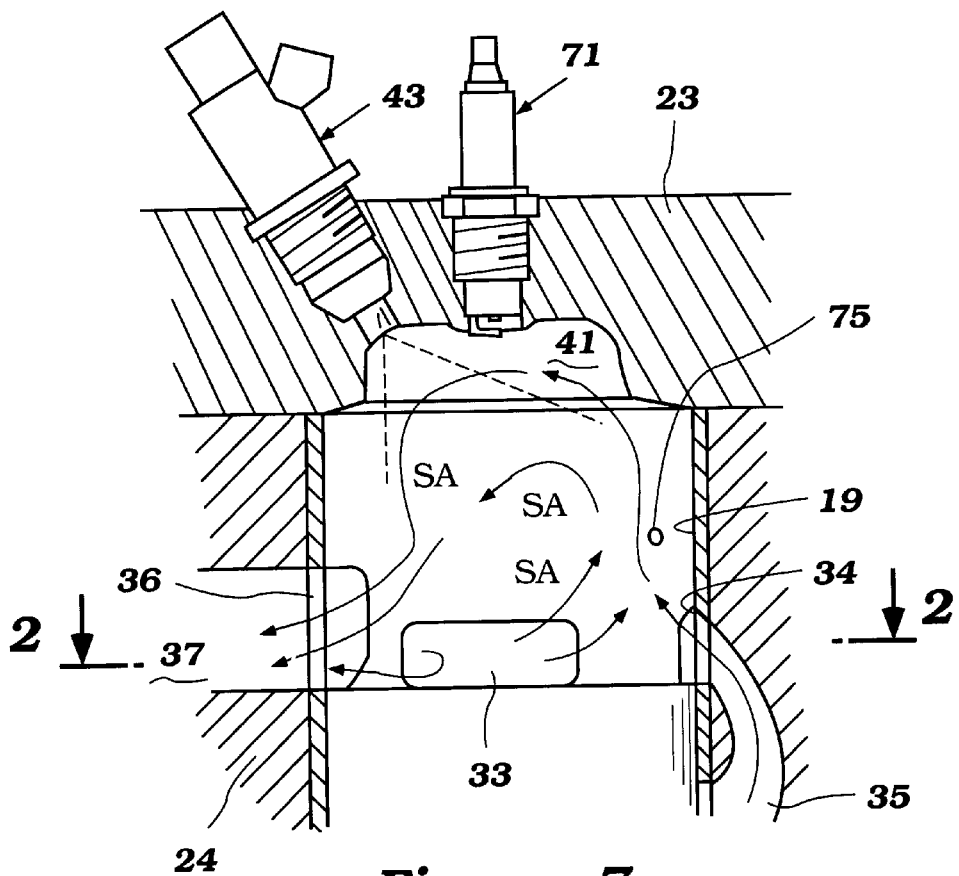
FIG. 7 is an enlarged cross-sectional view taken through a single cylinder of the engine and depicts part of the theory by which the control strategy operates.
Figure 8:
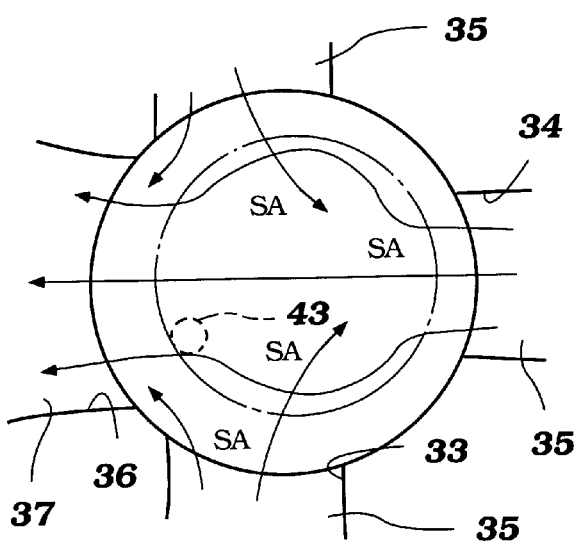
FIG. 8 is a cross-sectional view taken along the line 2—2 in FIG. 7 to further show the scavenging airflow pattern and the path of injected fuel.

Referring now additionally to FIGS. 7 and 8, it will be seen that each cylinder bore is provided with a scavenging system. In the illustrated embodiment, the scavenging system is of the Schnurl type and includes a pair of side, main scavenge ports 33 and a center, auxiliary scavenge port 34. Scavenge passages 35 communicate the crankcase chambers 25 with each of the scavenge ports 34. As is well known in two stroke practice, the scavenge ports 33 and 34 are opened and closed by the reciprocation of the pistons 21 in the cylinder bores 19.

It should be noted that the main scavenge ports 33 are disposed on opposite sides of an exhaust port 36 which is diametrically opposite the auxiliary scavenge port 34. As may be best seen in the lower left-hand portion of FIG. 5 and in FIG. 6, the exhaust ports 36 communicate with exhaust manifolds 37 that are formed integrally within the cylinder block 18. Basically, there is an exhaust manifold 37 for each bank of cylinders.

These exhaust manifolds 37 terminate in exhaust pipes 38 that depend into a pair of expansion chambers 39 formed in the driveshaft housing and lower unit 16. A partition 39a is provided between the expansion chambers 39. Each expansion chamber 39 has an enough capacity for a pressure wave of exhaust gasses (burnt charge) from the cylinders of each bank to be released to the atmospheric pressure state. These expansion chambers 39 communicate with a suitable high speed underwater exhaust gas discharge and a low speed, above the water exhaust gas discharge of any known type. Also, the lengths of the respective exhaust pipes 38 are different to each other. Because the cylinders #1 to #6 are disposed vertically with each other and hence respective heights from the surface of the water are also different.

Figure 2:
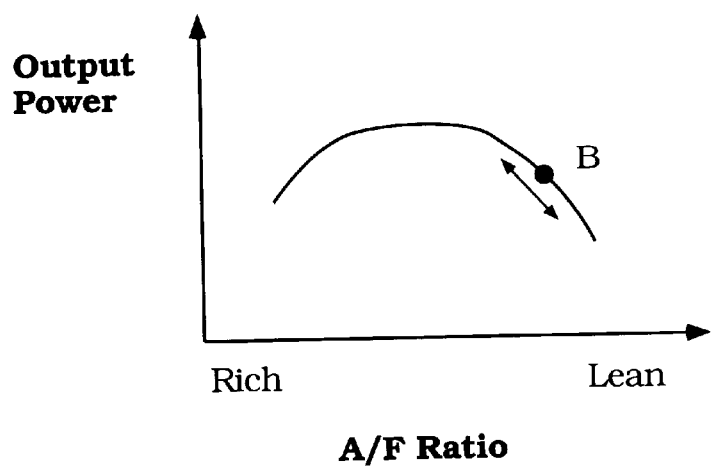

The underwater exhaust gas discharge is shown primarily in FIG. 2 and includes a conduit 40 that depends through the lower unit portion of the drive shaft housing lower unit and which communicates through the hub underwater discharge formed in the propeller 17.

As has been previously noted, the trim and height of the propeller 17 can be adjusted and this adjustment will change the depth of submersion of the underwater discharge during engine running. In addition, various water conditions may also cause this height to vary during engine running. In addition, various water conditions may also cause this height to vary during engine running. Thus, the back pressure on the exhaust system will be variable and this back pressure is particularly significant in effecting the rate of airflow in scavenging the combustion chambers of the engine. Thus, a condition is present with marine applications that is not existent normally in automotive applications and which can seriously effect the feedback control.

As the pistons 21 move downwardly in their cylinder bores 19 toward the bottom dead center position, the charge compressed in the crankcase chambers 25 will be compressed and eventually transfer to the respective engine combustion chamber, indicated generally by the reference numeral 41 through the scavenge passages 35 and scavenge ports 33 and 34 when they are opened by the movement of the piston 21. With the upward movement of the piston 21, a part of the scavenging air flow, indicated by the arrows SA in FIGS. 7 and 8, goes out with the burnt charge through the exhaust port 36. This is the blow-out. One of the objects of this invention is, as described above, to reduce dispersion in amounts of the blow-out, eventually in air intake efficiency, between the respective cylinders #1 to #6 so as to optimize air fuel ratio at each cylinder.

In accordance with an important feature of the invention, the engine 13 is provided with a direct cylinder fuel injection system. This fuel injection system is shown in part schematically in the upper portion of FIG. 5 and will now be described by particular reference to that figure. Before referring thereto, however, it should be noted that fuel injectors 43 are mounted in the cylinder head assembly 23 so as to spray fuel from this fuel supply system directly into the combustion chambers 41.

As is typical with outboard motor practice, the outboard motor 11 is supplied with fuel from a main fuel tank 44 which is normally mounted within the hull of the associated watercraft. Fuel is supplied from this tank 44 by a first low pressure pump 45 to a fuel filter 46 that is mounted within the protective cowling 12. The connection from the fuel tank 44 to the filter 46 includes a conduit 47 having a quick disconnect coupling of a known type.

A second, engine driven low pressure fuel pump 48 in the power head 12 collects the fuel from the fuel filter 46 and delivers it to a vapor separator, indicated generally by the reference numeral 49. The low pressure fuel pumps 48 may be of the type that is operated by crankcase pressure variations as is well known in this art.

The vapor separator 49 includes an outer housing 51 that is mounted at a suitable location within the protective cowling 15. A level of fuel, indicated at 52 is maintained in this housing 51 by a valve operated by a float 53.

Contained within the housing 51 is an electrically driven pressure pump 54 which develops a higher pressure than the pump 48 but a pressure that is not really high enough for effective high pressure direct cylinder injection.

This fuel is discharged from the vapor separator housing 51 through a supply conduit 55 to a high pressure, engine driven, and positive displacement pump 56. The pump 56 may be of any known type and preferably has one or more plungers operated by cams for delivering extremely high pressures at a positive displacement. The pressure at which fuel is delivered to the high pressure pump 56 is regulated by a low pressure regulator 57 in a return line 58 that communicates the pressure line 55 back with the interior of the vapor separator body 51.

The high pressure pump 56 delivers fuel under pressure to a main fuel manifold 59 through a conduit in which a check valve 61 is positioned. A parallel conduit 62 extends around the high pressure pump 56 to the main fuel manifold. A check valve 63 is provided in this bypass line so that when the high pressure pump 56 is generating high pressure fluid, no flow will occur through the line 62.

A high pressure regulator 64 is provided in a return line 65 and limits the maximum pressure of the fuel supply to the fuel injectors 43. This is done by dumping fuel back to the vapor separator assembly 49 through the return line 65. A fuel heat exchanger or cooler 66 may be provided in this return line 65 so as to ensure that the fuel is not at too high a temperature.

A pressure sensing device 67 is provided also in the return line 65 for providing a fuel pressure signal to an ECU (electronic control unit), indicated at 68 in FIG. 1 for controlling the engine systems, as will be described.

The main fuel manifold 59 supplies fuel to a pair of fuel rails 69 each of which is associated with a respective one of the cylinder banks. The fuel rails 69 each supply fuel in a known manner to the fuel injectors 43 of the respective cylinder banks.

As seen in FIGS. 7 and 8, the fuel injectors 43 are mounted in the cylinder head assemblies 23, in the illustrated embodiment, over the exhaust ports 36 on the exhaust side of the engine 13. These injectors 43 spray downwardly toward the heads of the pistons 21. The fuel injectors 43 are preferably of the solenoid operated type and have a solenoid control valve which, when opened, controls the discharge of fuel into the combustion chambers as shown in broken lines in FIG. 7 so as to provide a fuel patch in the combustion chamber, the size of which depends upon the duration of fuel injection.

Spark plugs 71 are mounted in the cylinder head assemblies 23 and have their spark gaps disposed substantially on the axis of the cylinder bores 19. These spark plugs 71 are fired by an ignition circuit under the control of the ECU 68.

The ECU 68 controls the timing of firing of the spark plugs 71 and the beginning and duration of fuel injection by the injector 69. To this end, there is provided a number of sensors which sense either engine running conditions, ambient conditions or conditions of the outboard motor 11 that will effect engine performance. Certain of the sensors are shown schematically in FIG. 1 and will be described by reference to that figure. It should be readily apparent to those skilled in the art, however, that other types of sensing and control arrangements may be provided operating within the general parameters which will be set forth later having to do with the timing of initiation of fuel injection.

A crank angle sensor 72 is associated with the crankshaft 14. This sensor 72 provides not only a signal of crank angle but by comparing that signal with time an indication of crankshaft rotational speed.

There is also provided a crankcase pressure sensor 73 which senses the pressure in one or all of the crankcase chambers 25. By measuring crankcase pressure at a particular crank angle, engine air induction amount can be determined.

Engine or operator demand is determined by a throttle position sensor 74 that operates in conjunction with a throttle valve 28 so as to determine this function.

The ECU 68 operates primarily on a feedback control condition and thus, an air fuel ratio sensor 75 is provided that communicates with the combustion chambers or exhaust port of at least one of the cylinder. Preferably, an oxygen ($O_2$) density sensor is utilized for this purpose, although other types of devices may be employed.

In order to provide a good indication of the fuel/air ratio, it is important that the oxygen sensor 75 is positioned so that it will sense the combustion products near the completion of combustion and before a fresh charge of air is delivered to the combustion chamber. Therefore, and as best shown in FIG. 7, the oxygen sensor 75 is provided so that its probe opens into the cylinder bore 19 at a point that is disposed slightly vertically above the upper edge of the exhaust port 36. In this way, the oxygen sensor 75 will be in a position to receive combustion products immediately before opening of the exhaust port and most positively before the opening of the scavenge ports so that it will sense the combustion products at the time combustion has been substantially completed.

In this regard, however, in one embodiment of this invention, as described more in detail with reference to FIG. 11 later, the ECU 68 controls the injection timing of the first cylinder #1 to be advanced. Thus, only in this cylinder #1, a large amount of unburnt charge reaches the oxygen sensor 75 as well as the combustion products.

Engine temperature is sensed by an engine temperature sensor 76. The temperature of the cooling water drawn from the body of water in which the watercraft or outboard motor 11 is operated is measured by a water temperature sensor 77.

In addition to controlling timing of firing of the spark plugs 71 and initiation and duration of fuel injection by the fuel injectors 43, the ECU 68 may also control a lubricating system. This is comprised of an oil supply system including a pump 78 that sprays oil into the intake passages 29 for engine lubrication. In addition, some forms of direct lubrication may be also employed for delivering lubricant directly to certain components of the engine.

It has already been noted that the adjustment of the angle of the propeller 17 will change the vertical position of its high-speed exhaust discharge and accordingly the back pressure. Thus, there are provided additional sensors which sense factors that will indicate this depth. These comprise that is mounted on the outboard motor 11 and which senses its height adjustment. Also, is provided which senses the adjusted trim angle.

Other sensors may also be employed for control and some of these are associated with the engine 13 or the outboard motor 11 itself. These may include an engine height sensor, a trim angle sensor, an engine vibration or knock sensor, a neutral sensor, a watercraft pitch sensor, an atmospheric temperature sensor and a back pressure sensor. The back pressure sensor is provided preferably in the exhaust manifold 37. The neutral sensor cooperates with the aforenoted forward, neutral, reverse transmission and will provide an indication of when the watercraft is operating in neutral. Also, even an ignition switch is one of the sensors to sense the initiation of the engine operation.

Of course, the sensors described are only typical of those types of sensors which may be employed for the feedback control system, as will become apparent.

The components of the system as thus far described may be considered to be conventional and for that reason, where any component has not been illustrated or described in detail, reference may be had to conventional or known structures with which to practice the invention.

The basic control strategy will now be described with reference to FIG. 1 again more in detail.

Figure 1:
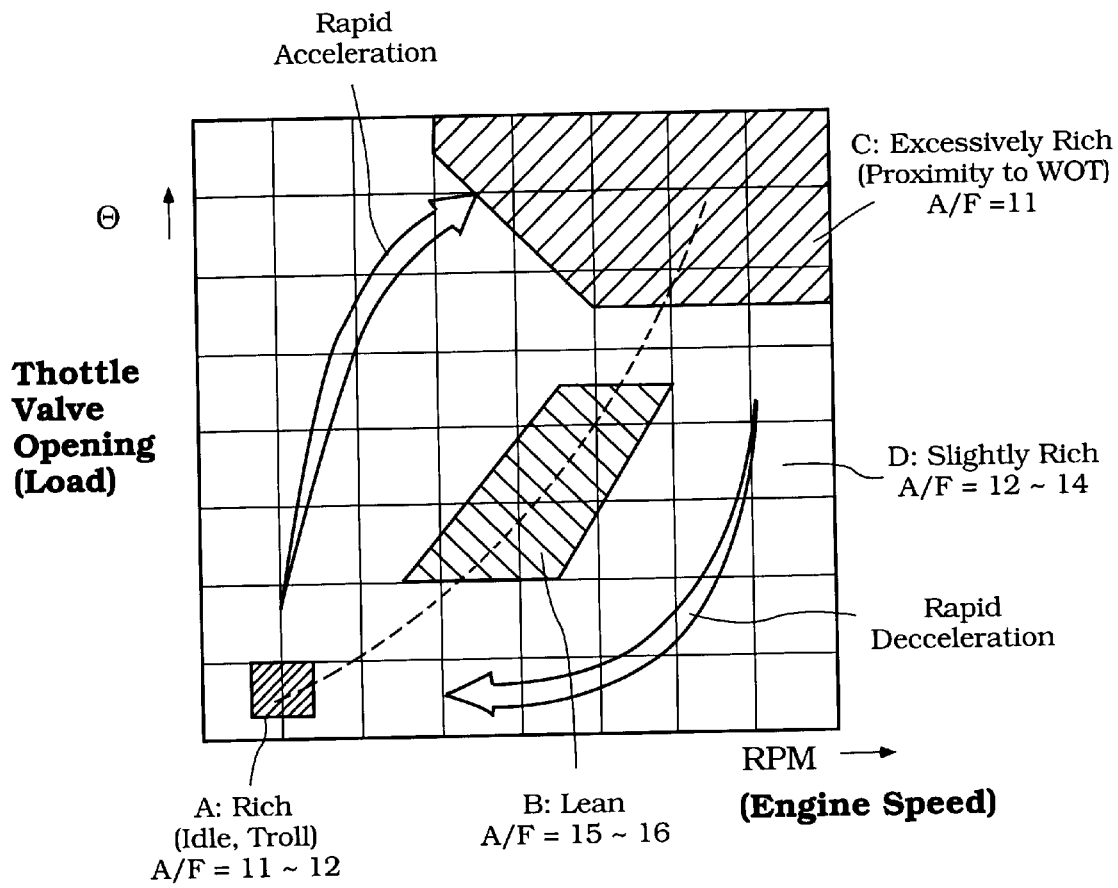
FIGS. 1 to 4 illustrate background conditions of this invention and will be referred again in the following detailed description of the preferred embodiment. Thus, these drawings should not be recognized as showing conventional art.

FIG. 1 illustrates a graphical view showing the determinations that are made in the ECU 68 to determine the engine operational range.

Under light loads and speeds the mixture is kept rich and the air fuel ratio is set so as to be in the range of about 11 to 12. The reference character A indicates this range.

In midrange conditions there is a control range where the engine is operated in a lean burn condition and the mixture may be somewhat stratified. This range is indicated by the reference character B and in this range the air fuel ratio is maintained in the range of about 15 to 16.

Under high load/high speed conditions which approaches wide-open throttle, there is a third control range indicated at C where the mixture is run on the excessively rich side to protect the engine from damage. In this range, the air fuel ratio is maintained about 11.

There is a remaining range outside of those noted which is indicated at D and in this range the mixture is kept on the weak side of rich, i.e., around 12 to 14.

There are also two other types of conditions which are indicated by the open arrows one of which represents rapid acceleration and the other of which indicates rapid deceleration.

Figure 9:
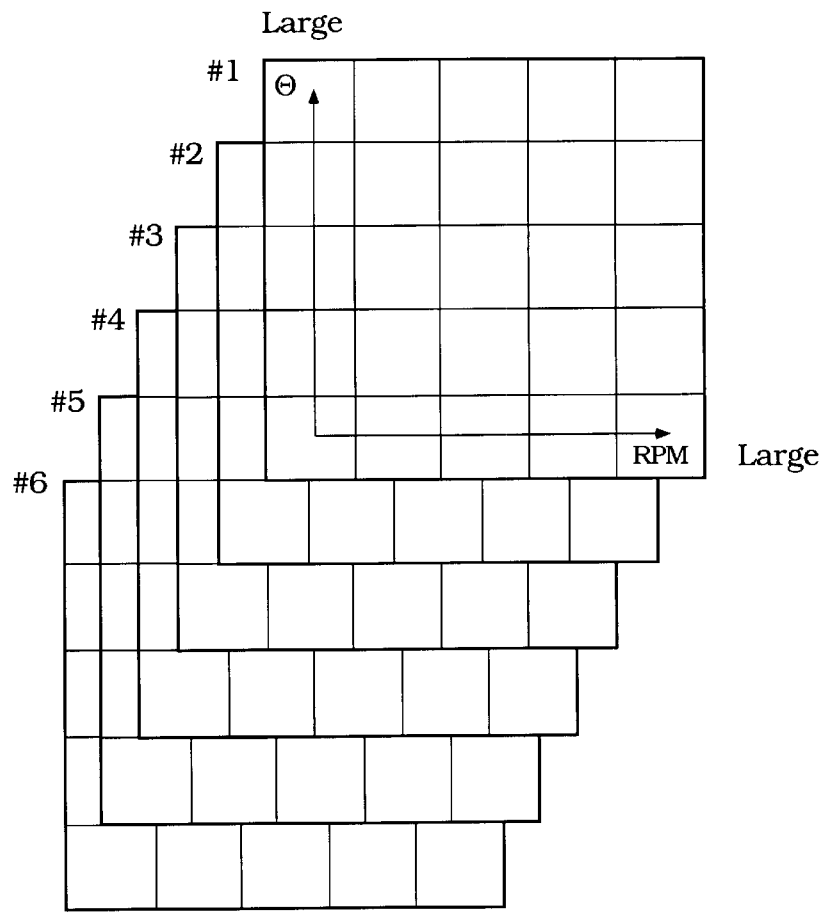
FIG. 9 is a control map showing the different control ranges per cylinder that are employed in conjunction with the invention.

The ECU 68 determines injection timing using a three-dimensional control map as shown in FIG. 9. The control map contains data formed with the engine speed versus the throttle valve opening (engine load), corresponding to the respective cylinders #1 to #6, and previously obtained in some experimental works. A variation, for example, is available wherein a map is provided only for the first cylinder #1 and the injection timings for the other cylinders #2 to #6 are adjusted to the injection timing of the first cylinder #1 by calculations. In this regard, it is also practicable to rewrite data of the map, for example, every season using a ROM such as $E^2ROM$. Whereby, the user is allowed to select data that is suitable to his or her preference and/or environmental conditions.

Figure 10:
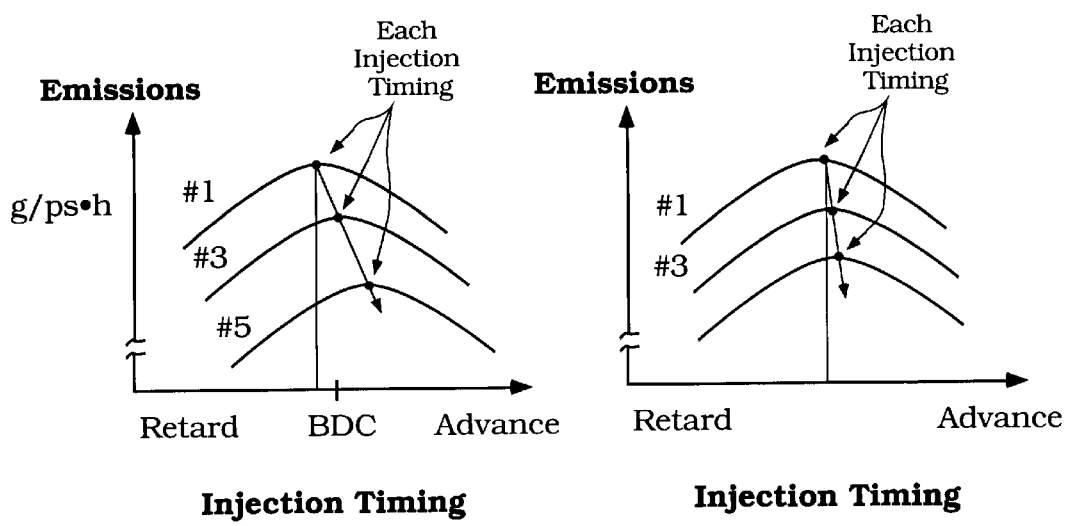
FIG. 10 is a graphical view showing the relationships between injection timing and emissions and also one embodiment of this invention. The left-hand side graph shows the relationship under the middle speed and middle load condition corresponding to the range B shown in FIG. 1, while the right-hand side graph shows the relationship under the high speed and high load condition corresponding to the range C shown in FIG. 1.

FIG. 10 illustrates a graphical view showing the relationships between injection timing and emissions. The left hand graph shows the relationship under the middle speed and middle load condition corresponding to the range B shown in FIG. 1, while the right hand graph shows the relationship under the high speed and high load condition corresponding to the range C shown in FIG. 1. Although only the characteristic curves of the first, third and fifth cylinders (#1, #3 and #5) are shown, the other characteristic curves of the second, fourth and sixth cylinders (#2, #4 and #6) are the same to the respective characteristic curves of the first, third and fifth cylinders (#1, #3 and #5). The peak of each curve indicates the minimum of the emissions. The term "emissions" means detrimental substances such as hydrocarbons HC contained in exhaust gasses.

In one embodiment, as shown in FIG. 10, the injection timings of the respective cylinders #1 to #6 are given at the respective peaks of the characteristic curves. Both down slopes from the peak indicate that the emissions increase if the injection timing is advanced or retarded rather than the most suitable injection timing corresponding to the peak of the curve.

As seen in this figure, the lower the cylinder is, the more the peak of the characteristic curve, i.e., the most suitable injection timing, is off to the advanced side with reference to the first cylinder #1. The reason for this is that the difference in length of the exhaust pipes 38 exerts smaller influence under the high speed and high load condition rather than the middle speed and middle load. As noted above, the curves go down at both of the right hand side (advanced side) and the left hand side (retarded side) relative to the peaks. Because, the earlier the injection timing is, the more the blow-out amount and also the output power increase. The early injection timing results in the sufficient mixing of the air charge with the injected fuel and then brings in the increase of the output power. Conversely, the later the injection timing is, the less the blow-out amount and the output power decrease. Incidentally, the injection timing means the initiation timing of the injection.

Figure 11:
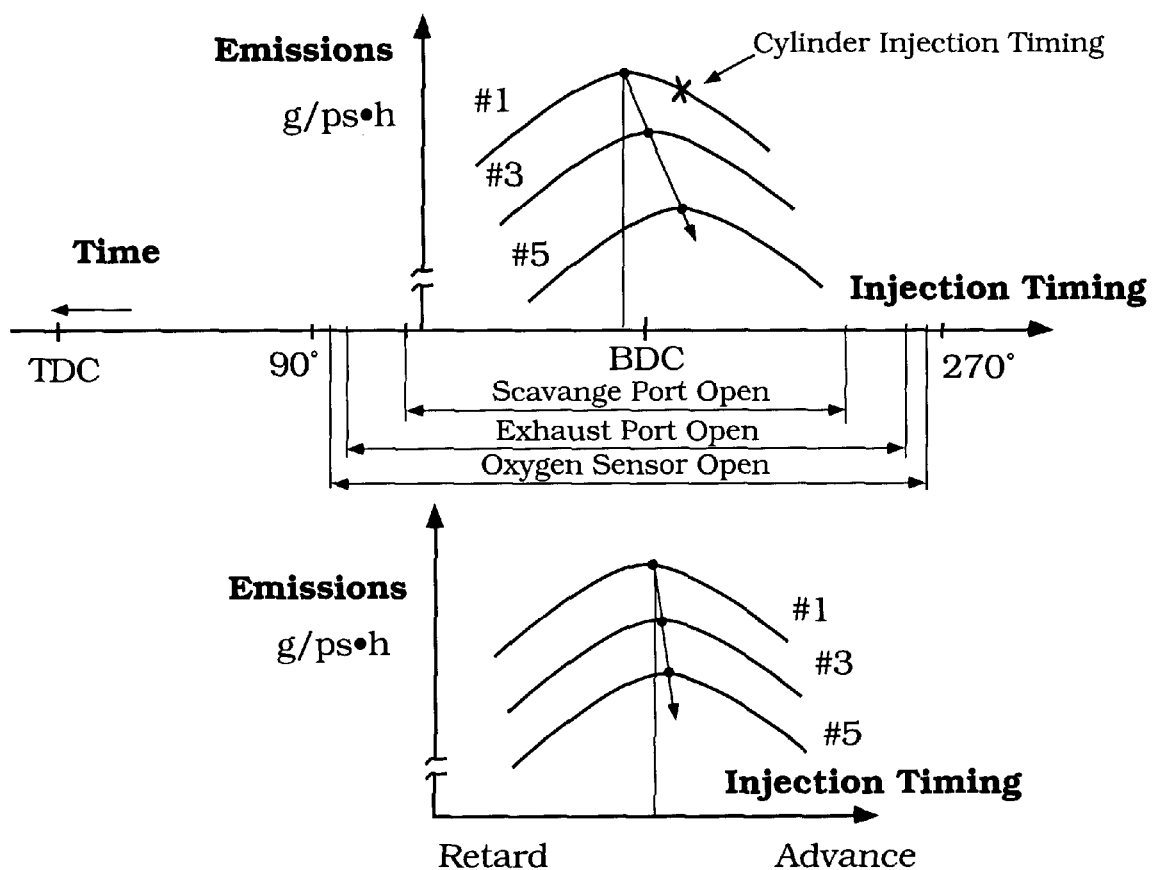
FIG. 11 is a graphical view showing the relationships between injection timing and emissions and also another embodiment of this invention. The upper graph shows the relationship under the middle speed and middle load condition corresponding to the range b shown in FIG. 1, while the lower graph shows the relationship under the high speed and high load condition corresponding to the range c shown in FIG. 1.

Another embodiment is shown in FIG. 11.

FIG. 11 illustrates a graphical view showing the same relationships between injection timings and amounts of emissions as shown in FIG. 10. The upper graph shows the relationship under the middle speed and middle load condition corresponding to the range B shown in FIG. 1, while the lower graph shows the relationship under the high speed and high load condition corresponding to the range C shown in FIG. 1. The curves for the cylinders #2, #4 and #6 are omitted as in FIG. 10.

In this embodiment, the injection timing of the reference cylinder, i.e., the first cylinder #1 which has the $O_2$ sensor 75, is shifted to the advanced side rather than the peak position as seen in FIG. 11. In the mean time, the injection timings of the other cylinders #3 and #5 are remained at the positions where the respective peaks exist. The arrangements of the injection timings are given under every running condition of the engine 13. Although it is not shown in the lower graph, the injection timing of the first cylinder #1 is also shifted to the advanced side.

Figure 3:
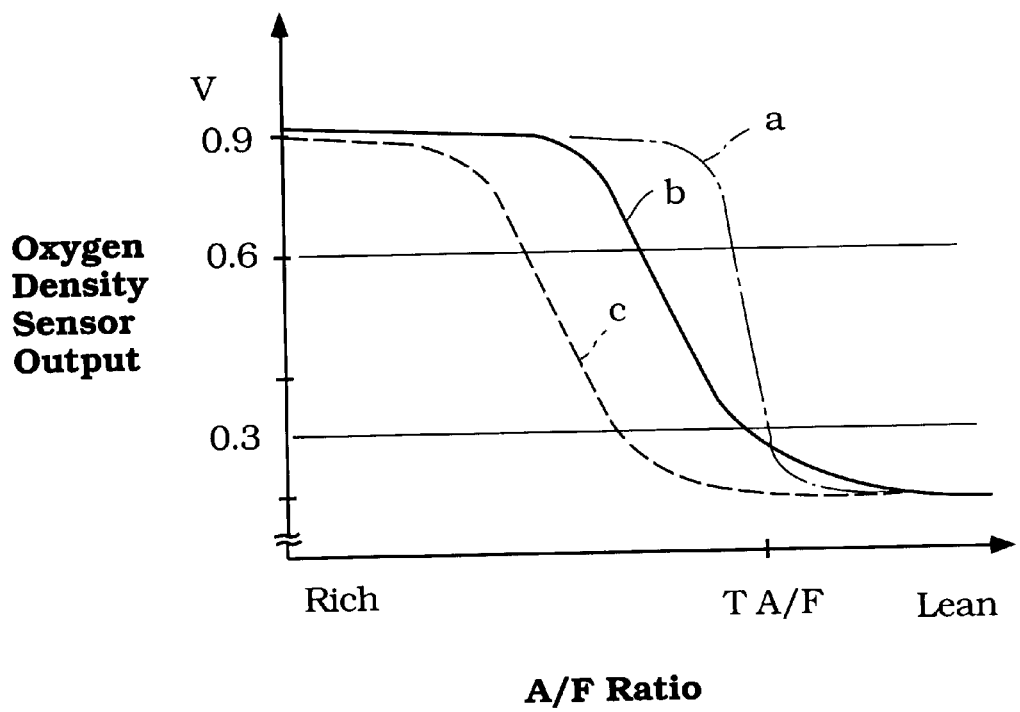
Figure 4:
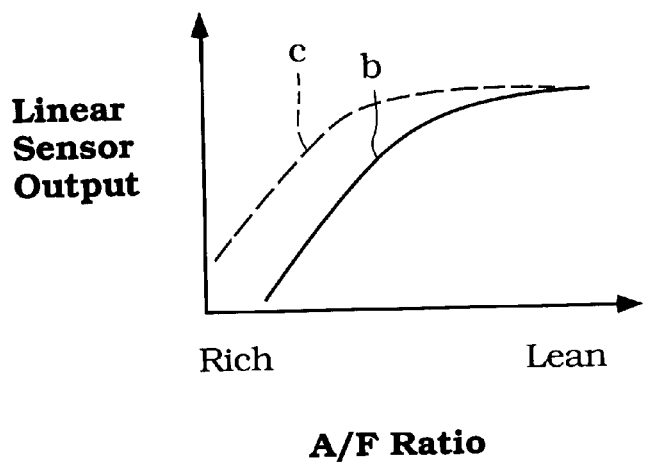

Because of the advanced injection timing for the first cylinder #1, a relatively large amount of unburnt charges can reach the $O_2$ sensor 75 during the $O_2$ sensor 75 is exposed to the unburnt charges. More specifically, as seen in FIG. 11, the $O_2$ sensor 75 is exposed to the combustion chamber before both of the exhaust port and the scavenge port open and after these ports are closed. Because of this arrangement, the unburnt charge can contain air charges and the fuel injected at the advanced timing. Accordingly, the characteristic curve c shown in FIG. 3 shifts to the right hand side so that it approaches to the theoretical air fuel ratio represented by the curve a, at least to almost the same position as the curve b. Thus, the optimal feed back control of the air fuel ratio can be done based upon the output of the $O_2$ sensor 75.

On the other hand, the first cylinder #1 has slightly richer fuel and a barely larger blow-out amount. However, only the injection timing of the first cylinder #1 is sifted from the peak position and the other injection timings of the cylinders #2 to #6 still remain at the peak positions. Accordingly, deterioration in fuel efficiency does not substantially occur.

As shown in FIG. 11, when scavenge ports 33, 34 are opened, the exhaust ports 36 are always opened. While, the exhaust ports 36 are opened, the $O_2$ sensor 75 is always exposed to the combustion chamber. Although this arrangement is desirable, it is also applicable arrangement wherein the $O_2$ sensor 75 is exposed to the combustion chamber during at least a part of said certain period time in which said scavenge ports 33, 34 and exhaust ports 36 are opened.

The fuel injection control described above can be done based upon the control map shown in FIG. 9 that is previously made so as to be adapted to each characteristic of the respective cylinders #1 to #6. Thus, the respective cylinders #1 to #6 operate under the most suitable air fuel ratio, emissions and fuel efficiency conditions so that no dispersions between the respective cylinders come into existence.

The emissions contain primarily hydrocarbons HC. In order to improve the emissions, therefore, the hydrocarbons HC are reduced as much as possible. Meanwhile, the improvement of the fuel efficiency is done in keeping the balance with the improvement of the emissions.

The control map is made under the ideas described above and eventually the injection timings of the respective cylinders #1 to #6 are changed with the control map.

The feed back control described above belongs to an opened-loop type feed back control in which injection timings are fixed on a control map. However, other feed back controls such that belongs to a closed-loop type are of course applicable instead of this feed back control. In one of such other controls, for example, fluctuations in the engine output power are calculated based upon the engine speed, combustion pressure or knocking conditions and then the fluctuations are reduced to the minimum by the injection timing control in accordance with the concept of this invention.

It is also practicable to apply both of the opened-loop type feed back control and the closed-loop type feed back at the same time or to apply either of them alternately. Also, the control map can be rewritten every predetermined period of time in response to, for examples, user's preference and environmental conditions by a learning system using, for example, a fuzzy neural network.

Further, the fuel injection control system described above adjusts only the injection timings. However, it is surely practicable to adjust amounts of injected fuel as well as the injection timings.

The embodiments thus far described are all in connection with an outboard motor. However, the invention also can be utilized with various engines such as another marine engine, a land vehicle engine including a lawn mower engine and a stationary engine.

As described above, in accordance with a concept of this invention, a fuel injection control device shifts injection timings of respective cylinders to each other.

In one aspect of the invention, injection timings of the respective cylinders exist at the respective minimum points of emissions. This is useful for both of a four stroke engine and a two stroke engine. However, in another aspect of the invention, one injection timing that is for a cylinder having an air fuel sensor is shifted to the advanced side. This feature is particularly useful for a two stroke engine. Because the characteristic of the air fuel ratio sensor that tends to deviate to the rich side can be brought back to the proper lean side, i.e., a position that is the proximity to the theoretical air fuel ratio.

Accordingly, both of emissions and fuel efficiency can be improved.

Of course, the foregoing description is that of preferred embodiments of the invention, and various changes and modifications may be made without departing from the spirit and scope of the invention, as defined by the appended claims.

What is claimed is:

1. A direct cylinder injected, internal combustion engine comprising a plurality of cylinders each having a combustion chamber, an air induction system for delivering an air charge to said respective combustion chambers, a plurality of fuel injectors being provided for said respective combustion chambers for injecting fuel directly into said combustion chambers for burning with the air charge delivered by said induction system, an exhaust system for discharging the burnt charge from said combustion chambers, and a control device for separately controlling at least an injection timing of each one of said fuel injectors such that said injection timing of each one of said fuel injectors can be independently adjusted based on engine operating characteristics and said control device shifting the respective injection timings of said cylinders relative to each other so that at least one of the state of emissions contained in the burnt charge and the state of fuel efficiency is almost optimal in every cylinder.

2. A direct cylinder injected, internal combustion engine as set forth in claim 1 wherein said engine further comprises means for sensing a ratio of the air charge with the fuel and said control device controls the ratio of the air charge with the fuel based upon the output of said means for sensing a ratio of the air charge with the fuel.

3. A direct cylinder injected, internal combustion engine as set forth in claim 2 wherein said control device controls the respective injection timings of said fuel injectors so that said fuel injectors inject the fuel at the timing where emissions contained in the burnt charge are almost the minimum at each cylinder.

4. A direct cylinder injected, internal combustion engine as set forth in claim 2 wherein said engine further comprises means for sensing a ratio of the air charge with the fuel that is provided on one of said cylinders and said control device controls the ratio of the air charge with the fuel based upon the output of said means for sensing a ratio of the air charge with the fuel.

5. A direct cylinder injected, internal combustion engine as set forth in claim 4 wherein said control device controls the injection timing of said fuel injectors so that the output of said means for sensing a ratio of the air charge with the fuel per se approaches a theoretical ratio of the air charge with the fuel.

6. A direct cylinder injected, internal combustion engine as set forth in claim 5 wherein said means for sensing a ratio of the air charge with the fuel is provided to be exposed to said combustion chamber so that the unburnt charge reaches said means for sensing a ratio of the air charge with the fuel.

7. A direct cylinder injected, internal combustion engine as set forth in claim 5 wherein the respective injection timings of said cylinders are the timings where emissions contained in the burnt charge are almost the minimum at each cylinder.

8. A direct cylinder injected, internal combustion engine as set forth in claim 7 wherein the injection timing of said cylinder having said means for sensing a ratio of the air charge with the fuel is advanced than the timing where emissions are almost the minimum.

9. A direct cylinder injected, internal combustion engine as set forth in claim 1 wherein said engine operates on a two stroke crankcase compression principle.

10. A direct cylinder injected, internal combustion engine as set forth in claim 1 wherein said engine further comprises a crankcase in which a crankshaft is rotated by pistons reciprocating in said combustion chambers, scavenge passages connecting said crankcase to said combustion chambers, said scavenge passages have scavenge ports opening to said combustion chambers, the air charge is firstly delivered to said crankcase chamber for compression and then forwarded to said respective combustion chambers through said scavenge passages, said exhaust system has exhaust passages having exhaust ports opening to said combustion chambers, said scavenge ports and said exhaust ports are either opened or closed to said combustion chambers by said pistons, and both of said scavenge ports and said exhaust ports are simultaneously opened at least certain period of time.

11. A direct cylinder injected, internal combustion engine as set forth in claim 10 wherein said engine further comprises means for sensing a ratio of the air charge with the fuel and said control device controls the ratio of the air charge with the fuel based upon the output of said means for sensing a ratio of the air charge with the fuel, said means for sensing a ratio of the air charge with the fuel is capable to be exposed to said combustion chamber so that the burnt charge reaches said means for sensing a ratio of the air charge with the fuel, and said means for sensing a ratio of the air charge with the fuel is exposed to said combustion chamber during at least a part of said certain period time in which both of said scavenge ports and said exhaust ports are opened.

12. A direct cylinder injected, internal combustion engine as set forth in claim 11 wherein the injection timings of said respective cylinders are the timings where emissions contained in the burnt charge are almost the minimum at each cylinder.

13. A direct cylinder injected, internal combustion engine as set forth in claim 12 wherein the injection timing of said cylinder having said means for sensing a ratio of the air charge with the fuel is advanced than the timing where emissions are almost the minimum.

14. A direct cylinder injected, internal combustion engine as set forth in claim 1 wherein said engine operates on a four stroke principle.

15. A direct cylinder injected, internal combustion engine as set forth in claim 1 wherein said cylinders are vertically disposed with each other.

16. A direct cylinder injected, internal combustion engine as set forth in claim 15, wherein said engine further comprises means for sensing a ratio of the air charge with the fuel and said control device controls the ratio of the air charge with the fuel based upon the output of said means for sensing a ratio of the air charge with the fuel.

17. A direct cylinder injected, internal combustion engine as set forth in claim 16 wherein said control device controls the respective injection timings of said fuel injectors so that said fuel injectors inject the fuel at the timings where emissions contained in the burnt charge are almost the minimum at each cylinder.

18. A direct cylinder injected, internal combustion engine as set forth in claim 17 wherein said injection timing is more advanced at a lower cylinder than an upper cylinder.

19. A direct cylinder injected, internal combustion engine as set forth in claim 17 wherein the injection timing of said cylinder having said means for sensing a ratio of the air charge with the fuel is advanced than the timing where emissions contained in the burnt charge are almost the minimum.

20. A direct cylinder injected, internal combustion engine as set forth in claim 1 wherein said exhaust system discharges the burnt charge to the atmosphere through the body of water.

21. A direct cylinder injected, internal combustion engine as set forth in claim 20 wherein said exhaust system has exhaust passages having different lengths at each cylinder.

22. A direct cylinder injected, internal combustion engine as set forth in claim 1 wherein said control device has a control map for each cylinder and controls the injection timing based upon said control map.

23. A direct cylinder injected, internal combustion engine as set forth in claim 22 wherein said air induction system has a throttle valve for admitting the air charge to said combustion chambers, said engine further comprises a throttle valve opening sensor for sensing the opening of said throttle valve and an engine speed sensor for sensing the engine speed and said control map includes a matrix formed with data regarding the engine speed and throttle valve opening.

24. A direct cylinder injected, internal combustion engine as set forth in claim 1 said engine further comprises means for sensing fluctuations in the engine output power and said control device controls the injection timing based upon the output of said means for sensing fluctuations in the engine output power so that the output of said means for sensing fluctuations in the engine output power is small.

25. An internal combustion engine comprising a plurality of combustion chambers, a plurality of fuel injectors corresponding to said plurality of combustion chambers, at least one of the fuel injectors arranged to directly spray fuel into the corresponding combustion chamber, a plurality of exhaust passages corresponding to the plurality of combustion chambers, at least one of the exhaust passages communicating with the corresponding combustion chamber, at least two of the exhaust passages having different lengths from each other such that one of the two is a shorter exhaust passage and another of the two is a longer exhaust passage, a control unit configured to individually control at least an injection timing of each of the fuel injectors, the control unit capable of advancing the injection timing of the fuel injector that corresponds to the combustion chamber communicating with the shorter exhaust passage relative to the injection timing of the fuel injector that corresponds to the combustion chamber communicating with the longer exhaust passage.

26. An internal combustion engine as set forth in claim 25 additionally comprising an air induction system arranged to supply air to the combustion chambers, an air/fuel ratio sensor arranged to sense a ratio of the air to the fuel, and the control unit bringing the ratio close to a preset ratio.

27. An internal combustion engine as set forth in claim 26, wherein the air/fuel ratio sensor is provided for only one of the combustion chambers.

28. An internal combustion engine as set forth in claim 27, wherein the control unit includes a control map having at least preset injection timings for the fuel injector that belongs to the combustion chamber at which the air/fuel ratio sensor is provided, and the control unit determines one of the injection timings based upon an output of the air/fuel ratio sensor.

29. An internal combustion engine as set forth in claim 27, wherein the air/fuel ratio sensor is exposed within the combustion chamber and the control map comprises an injection timing for the fuel injector associated with the combustion chamber containing the air/fuel ratio sensor that is advanced relative to an ignition timing that is initially determined for the fuel injector associated with the combustion chamber containing the air/fuel ratio sensor.

30. An internal combustion engine as set forth in claim 25 additionally comprising a generally vertically extending crankshaft and the exhaust passages extending generally parallel with the crankshaft.

31. A method for controlling an internal combustion engine having a plurality of combustion chambers, a plurality of fuel injectors corresponding to the combustion chambers, and a plurality of exhaust passages corresponding to the combustion chambers, respective lengths of the exhaust passages being different from each other, the method comprising the steps of: injecting fuel directly into the combustion chambers through the fuel injectors and advancing an injection timing of the fuel injector that belongs to the combustion chamber communicating with a shorter exhaust passage than an injection timing of the fuel injector that belongs to the combustion chamber communicating with a longer exhaust passage.

32. An internal combustion engine comprising a first cylinder bore and a second cylinder bore defined within a cylinder block, a first piston arranged to reciprocate within said first cylinder bore and a second piston arranged to reciprocate within said second cylinder bore, a first combustion chamber being defined at least in part by said first cylinder bore and said first piston and a second combustion chamber being defined at least in part by said second cylinder bore and said second piston, a first fuel injector disposed to inject fuel into said first cylinder and a second fuel injector disposed to inject fuel into said second cylinder, a control unit adapted to separately control at least an injection timing of said first fuel injector and said second fuel injector whereby said injection timing of said first fuel injector is capable of being advanced relative to said injection timing of said second fuel injector.

33. The engine of claim 32 further comprising a first exhaust passage communicating with said first combustion chamber and a second exhaust passage communicating with said second combustion chamber, said first exhaust passage being shorter than said second exhaust passage.

34. The engine of claim 33, wherein said first fuel injector directly injects fuel into said first combustion chamber and said second fuel injector directly injects fuel into said second combustion chamber.

35. The engine of claim 33 further comprising at least one scavenge passage extending from a crankcase chamber to a combustion chamber.

36. The engine of claim 33 further comprising an oxygen sensor positioned within at least one of said first combustion chamber and said second combustion chamber.

37. The engine of claim 33 further comprising an engine speed sensor and an engine load sensor that communicate with said control unit, wherein said control unit independently adjusts said injection timing of said first cylinder and said second cylinder in response to changes in engine speed and engine load.

38. The engine of claim 37, wherein said injection timing of said first cylinder is advanced when said engine speed and said engine load increase relative to said injection timing of said first cylinder when said engine speed is low and said engine load is low and said injection timing of said second cylinder is delayed when said engine speed and said engine load increase relative to said injection timing of said second cylinder when said engine speed is low and said engine load is low.

39. The engine of claim 33, wherein said control unit communicates with a first map and a second map and said first map contains a set of injection timing values for said first fuel injector and said second map contains a set of injection timing values for said second fuel injector.

40. The engine of claim 39, wherein said control unit contains said first map and said second map.

41. The engine of claim 33, wherein said control unit communicates with a first map that contains a set of injection timing values for said first fuel injector and said control unit manipulates said set of injection timing values for said first fuel injector to derive injection timing values for said second fuel injector.

42. The engine of claim 41, wherein said control unit contains said first map.

* * * * *